United States Patent [19]

Kaneda

[11] Patent Number: 4,798,734

[45] Date of Patent: Jan. 17, 1989

[54] PROCESS FOR PREPARING SOYBEAN FOOD PRODUCTS

[75] Inventor: Kichizo Kaneda, Kyoto, Japan

[73] Assignee: K. Biological Science Laboratory Co., Ltd., Kyoto, Japan

[21] Appl. No.: 9,039

[22] Filed: Jan. 16, 1987

Related U.S. Application Data

[63] Continuation-in-part of Ser. No. 815,787, Jan. 3, 1986, abandoned, which is a continuation-in-part of Ser. No. 675,063, Nov. 26, 1984, abandoned.

[30] Foreign Application Priority Data

Jul. 25, 1984 [JP] Japan ................................ 59-153228

[51] Int. Cl.$^4$ ........................... A23C 11/10; A23J 1/14
[52] U.S. Cl. ..................................... 426/565; 426/570; 426/572; 426/598; 426/589; 426/634
[58] Field of Search ............... 426/565, 572, 598, 589, 426/634, 570

[56] References Cited

U.S. PATENT DOCUMENTS

| | | | |
|---|---|---|---|
| 3,901,978 | 8/1975 | Nelson et al. | 426/565 |
| 4,012,533 | 3/1977 | Jonas | 426/565 |
| 4,293,580 | 10/1981 | Rubenstein | 426/565 |
| 4,374,861 | 2/1983 | Trzecieski | 426/42 |
| 4,375,485 | 3/1983 | van Gennip | 426/570 |
| 4,376,791 | 3/1983 | Holbrook et al. | 426/565 |
| 4,389,425 | 6/1983 | Burr, II | 426/598 |
| 4,400,406 | 8/1983 | Morley et al. | 426/565 |
| 4,461,777 | 7/1984 | Murase et al. | 426/572 X |

FOREIGN PATENT DOCUMENTS 43630 12/1973 Japan.

OTHER PUBLICATIONS

Markley, K. S., "Soybeans & Soybean Products", vol. II, Interscience Pub., Inc., N.Y., 1951, pp. 998–999.

*Primary Examiner*—Jeanette Hunter
*Attorney, Agent, or Firm*—Wenderoth, Lind & Ponack

[57] ABSTRACT

A process for preparing soybean vegetable whipping cream is obtained by mixing soybean aqueous infusion to which is added soy cellulose, with vegetable oil to which are added alginic acid derivative, sugar ester, sodium polyphosphate, antioxidant and fruit wine, whereafter the mixture of the ingredients is stirred at low temperature to obtain a homogenous emulsion followed by aging at a low temperature.

2 Claims, No Drawings

PROCESS FOR PREPARING SOYBEAN FOOD PRODUCTS

This application is a continuation-in-part of now abandoned application Ser. No. 815,787, filed Jan. 3, 1986, which is a continuation-in-part of now abandoned Ser. No. 675,063, filed Nov. 26, 1984.

BACKGROUND OF THE INVENTION

This invention relates to a process for preparing soybean food products, for example, vegetable whipping cream which has excellent whipping properties, shape retention and preservability, by employing a soybean aqueous infusion.

More particularly, the invention relates to a process for preparing soybean food products such as whipping cream, frozen dessert, cooking sauce, vegetable beverage and dessert by using soybean aqueous infusion as one of the main ingredients.

A process for preparing confectionary whipping cream will now be described as an exemplary prior art process.

A confectionary whipping cream has been prepared conventionally based on milk fat containing from 40% to 45% by weight of fat. Since the so-called whipping cream is prepared from "milk" which is used as a main and basic material, it usually shows such disadvantages, when whipped physically, as a poor resistance to continuous stirring and a high sensitivity to temperature, which causes the product to easily undergo separation of milk serum and deformation. Due to the disadvantages mentioned above, the handling thereof should be so strict as to require skilled workers for smooth production thereof.

It has been frequently attempted to prepare soybean food products such as soybean whipping cream, etc. by employing soybean milk as a main ingredient. However, the attempts have brought forth only little success since it was difficult to remove an undesirable bean-like flavor from finished products. Therefore, the soybean food products thus prepared have been unpopular among consumers and moreover are accompanied by similar disadvantages to those prepared from "milk", as was heretofore explained.

SUMMARY OF THE INVENTION

It is an object of the present invention to improve prior art processes by overcoming the above mentioned disadvantages thereof in preparing soybean products, for example whipping cream and frozen dessert.

It is another object of the present invention to remove from the soybean food products an undesirable bean-like flavor characteristic of soybean aqueous infusion which is utilized as one of the main ingredients in the process for preparing soybean food.

These and other objects are accomplished by using a combination of soybean aqueous infusion, soy cellulose (i.e. soy fiber), vegetable oil, an alginic acid derivative or gelatin, sucrose, and a sugar ester.

DETAILED DESCRIPTION

As an exemplary embodiment of this invention is described hereinafter a process for preparing a low-calorie vegetable whipping cream free from any drawbacks found in conventional products, by the employment of soybean milk which has never been used in prior art processes for preparing soybean food products and which will be hereinafter called "soybean aqueous infusion" instead of cow or other animal milk as a basic or main ingredient thereof simultaneously with 30% by weight of vegetable oil.

More particularly, the embodiment provides a process for preparing economically producible vegetable whipping cream having superior foam stability, anti-sagging property, shape retention and preservability to those of conventional products and being free from an undesirable bean-like flavor characteristic of soybean aqueous infusion. The process comprises the obtaining of foam stability by the use of soybean protein and phospholipid, the use of soybean fiber or soy cellulose which is known as an effective stabilizer and the addition of alginic acid derivatives such as propylene glycol alginate together with sugar fatty acid ester which will be referred to as sugar ester, as emulsifier, and further the addition of sucrose, anti-oxidant and fruit wine such as brandy as a flavor enhancer of the product, to preferably not more than 30% by weight of vegetable oil.

Further advantages of the process may be found in the use of soy cellulose which acts not only as an efficient stabilizer for whipping cream production but also is effective to prevent geriatric and adult diseases.

The method of manufacturing the soybean aqueous infusion which is employed in the present invention will be explained with reference to Chart A illustrating the manufacturing process.

Chart A

| Process Steps | Conditions |
| --- | --- |
| 1. Soybeans (starting material) | Dried soybeans. |
| 2. Selection | To get rid of foreign materials and defective soybeans. |
| 3. Washing | By water at a temperature of 15° C.(±1° C.). |
| 4. Dehulling | To remove shells. |
| 5. Shattering (smashing) into fine particles | By high speed mixer. |
| 6. Adding cold water | Ratio of shattered materials to water is 1:20. |
| 7. Steam heating | At temperature of 100° C. for about 45–50 minutes. |
| 8. Vacuum filtration | By vacuum centrifugal filtrater. |
| 9. Deodorizing filtrate | By deodorizing equipment. Product free of sludge and bitter taste. |
| 10. Concentration | To be concentrated to one-half its weight when used for whipping cream. |
| 11. Testing | Standard test, microorganism test. |
| 12. Storage | |

Thus, dried beans are used as starting materials. Foreign materials and defective soybeans are eliminated. Then washing by water is carried out at the temperature of 15° C. (±1° C.) and as soon as dehulling to remove shells from soybeans is finished, the product is shattered into fine particles, e.g. having a maximum particle size of about 0.1 mm, by the use of a high speed mixer. Then 20 parts by weight of cold water are added to 1 part by weight of the shattered materials (a standard ratio is 1 : 15), followed by steam heating at the temperature of 100° C. for about 45–50 minutes and by filtration by means of a centrifugal vacuum filtrater. A deodorizing process is followed by a concentration process by which the product is concentrated to one-half its original weight for use in whipping cream manufacturing.

After testing for desired quality the product is sent to storage.

An example of the deodorizing process is one in which enzymes are inactivated by heating the filtrate for about 7-8 minutes at a temperature of about 100° C.

The soybean aqueous infusion thus produced may be used for manufacturing whipping cream. For frozen dessert, the same process is employed except for omitting concentration step 10, i.e. frozen dessert requires no concentration.

The components of the soybean aqueous infusion of this invention are listed in Chart 1, with a comparison against soybean milk available on the market.

| Chart 1 | | | | | |
|---|---|---|---|---|---|
| Classification | Water (%) | Protein (%) | Lipids (%) | Glucide (%) | Ash (%) |
| Soybean milk: | 90.8 | 3.6 | 2.0 | 2.9 | 0.5 |
| Adulterated soybean milk*: | 87.9 | 3.2 | 3.6 | 4.8 | 0.5 |
| Soybean milk beverage: | 86.3 | 1.7 | 1.6 | 10.1 | 0.3 |
| Soybean aqueous infusion of invention: | 93.2 | 2.7 | 1.7 | 2.4 | 0.1 |

*Adulterated soybean milk means impure soybean milk which is adjusted by mixing with some other substance such as glucide and lipids to make it tasty or easy to drink.

The soybean milk, adulterated soybean milk and soybean beverage available on the market contain fixed weight percentages of components set by the Japan Agricultural Standard. The soybean aqueous infusion prepared by this invention illustrated in Chart 1 exhibits a remarkable difference in weight percentages compared with those available on the market and has special emulsifying characteristics which will be described hereinafter in detail.

Therefore, the soybean product thus manufactured in accordance with this invention is called "soybean aqueous infusion" instead of soybean milk, etc. which are commercially available on the market, to distinguish between them.

The characteristic features of the soybean aqueous infusion will be described as follows:

a. The conventional soybean beverage is manufactured by soaking the beans in water for several hours followed by grinding with water to thereby extract the protein into the aqueous phase (U.S. Pat. No. 3,901,978). However, the present soybean aqueous infusion is prepared by shattering or crushing dehulled soybeans into fine particles by the use of a mixer before adding water thereto, and thereby a product of low viscosity is obtained.

b. The conventional soybean milk or beverage is obtained by a forced extraction from the materials ground beforehand by a grinder, and thereby the milk or beverage contains sludge of bitter taste, while the soybean product of this invention is obtained by a vacuum filtration system and is thereby free of sludge of bitter taste. The term "soybean aqueous infusion" is adopted to discriminate the present soybean product from the conventional soybean milk etc.

The scope of utilization of the present soybean aqueous infusion will be explained as follows:

a. The soybean aqueous infusion is an excellent emulsive material which can be utilized for manufacturing soybean food products of various types.

b. The infusion contains water in a ratio of 1 : 20 (i.e. 20 parts water) and can be used for manufacturing frozen dessert by using about 65-95% by weight of the infusion as an ingredient, and for whipping cream by using about 65-75% by weight of the condensed infusion, i.e. which has been condensed to 50% by weight as indicated in Chart A.

The process of manufacturing the soy cellulose (i.e. soy fiber) of this invention is shown in Chart B.

| Chart B | |
|---|---|
| Process Steps | Conditions |
| 1. Starting material | Insoluble residue. |
| 2. Soaking in water | For about 3 minutes. |
| 3. Hydrolyzation | By 1/10 N HCl, normal solution based on the Japanese Pharmacopoeia. |
| 4. Neutralization | By 1/10 N NaOH, normal solution based on the Japanese Pharmacopoeia. |
| 5. Washing by water | To remove NaCl. |
| 6. Dehydration | By centrifugal dehydrator. |
| 7. Drying | By far infrared ray for 24 hours. |
| 8. Cutting into fine pieces | By high speed cutter. |
| 9. Test | Testing for fiber size and microorganisms. |

Thus, as starting material, the soybean residue (i.e. filter cake) obtained from step 8 of the soybean aqueous infusion manufacturing process in Chart A as by-product is used. The residue usually contains an insoluble substance which is hydrolyzed by a normal solution of 1/10 N HCl based on the Japanese Pharmacopoeia, followed by neutralization with 1/10 N NaOH based on the Japanese Pharmacopoeia. NaCl thus formed is removed by washing with water at the next step, and through dehydration and drying by far infrared rays for about 24 hours, the amount of water is reduced from 80% to 20%. The material thus prepared is cut into fine particles, e.g. having a maximum particle size of about 2.0 microns, preferably a particle size of 1.0-2.0 microns, by a high speed cutting device, and final testing is carried out to examine fiber size and test for microorganisms.

The above residue, an intermediate product of the soybean milk manufacturing process, usually contains an insoluble substance. The substance is hydrolyzed, as explained above, to increase the percentage of fiber contained therein.

The soy cellulose component thus prepared, as shown in Chart 2, has different characteristics compared with the conventional residue, and the term "soy fiber" or "soy cellulose" is used for representing the residue of this invention for the purpose of distinguishing over the conventional products.

| Chart 2 | | | | | | |
|---|---|---|---|---|---|---|
| Classification | Water (%) | Protein (%) | Lipids (%) | Glucide (%) | Fiber (%) | Ash (%) |
| Soybean residue for commercial use: | 81.2 | 4.8 | 3.6 | 6.4 | 3.3 | 0.8 |
| Dried soybean residue for commercial use: | 12.0 | 18.2 | 16.4 | 18.7 | 17.4 | 5.0 |
| Dried soy cellulose of invention: | 12.0 | 5.3 | 4.5 | 3.2 | 68.5 | 8.3 |

Chart 2 is a component comparison list between the conventional soybean residues and that of this invention. The conventional residues contain an abundance of organic compounds which have been removed during the manufacturing process of soy cellulose of this invention in order to obtain a soybean residue which contains a high percentage of fiber. The residue thus prepared is called "soy fiber" or "soy cellulose".

Experiments reveal the percentage of water absorption and oil absorption of the soy cellulose as shown below.

| Addition percentage of soy cellulose: | 10% | 20% |
|---|---|---|
| Water absorption %: | 73.2 | 75.5 |
| Oil absorption %: | 8.5 | 8.6 |

In the experiments, turbid soybean infusion mixed with 10% of safflower oil is counted as 100% and to this turbid soybean infusion 10% or 20% of soy cellulose is added, whereby the percentage of water or oil absorption of soy cellulose is obtained as shown above.

The soy cellulose is thus utilized in the present invention for manufacturing soybean food products. For emulsification, 0.3% to 0.5% of soy cellulose may be used.

The following example will be presented for illustrating in detail the present invention. Unless otherwise indicated, percentages shown hereinafter are by weight based on the weight of the food product.

In the process of the present invention, inexpensive vegetable oil in an amount of not more than 30% by weight is employed. This oil is added to soybean aqueous infusion containing 0.1%–0.3% of soy cellulose, and to the resultant mixture are added 0.1%–0.3% of alginic acid derivative or gelatin (e.g. 0.1%–0.3% of propylene glycol alginate), 0.3%–0.5% of sucrose, 0.01%–0.1% of a polyphosphate (e.g. 0.01%–0.1% of sodium hexametaphosphate), an anti-oxidant, not more than 3% of a fruit wine (e.g. not more than 3% of brandy) and 0.1%–0.5% of sucrose fatty acid ester (hereinafter called "sugar ester"), whereafter the mixture thereof is homogenized and aged at low temperature (e.g. not higher than 10° C.) whereby complete gelation is accomplished to obtain whipping cream. The addition of soy cellulose makes it possible for a homogenizer to produce an excellent emulsion from the mixture (the texture of the emulsion being presumably in a state of colloidal solution wherein soybean protein particles closely fitted to soy cellulose (semi-cellulose) particles respectively are arranged circumferentially around a particle of vegetable fat), while the addition of alginic acid derivative promotes conversion of oil foam into plastic foam with the result that the product has an improved thermal resistance and shows no sagging at 30°–35° C.

Furthermore, sugar ester (i.e. hydrophilic emulsifier) acts as a suitable emulsifier for the mixture prepared by adding soy cellulose and alginic acid derivative to soybean aqueous infusion which comprises soybean protein and soybean oil containing lecithin having hydrophilic, proteophilic and lipophilic properties.

The sugar ester used in the present invention is, as indicated above, a sucrose fatty acid ester. The sugar ester has the formula:

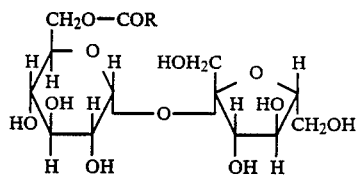

wherein —COR is the residue of the fatty acid. The fatty acid is preferably one or a mixture of saturated fatty acids having 12 to 16 carbon atoms, e.g. lauric acid, myristic acid and palmitic acid.

An example of the sugar ester which can be used in the present invention is sold by The Japan Sugar Refinery Co., Ltd. under the name of Nittoester.

In addition, when these three additives, i.e. soy cellulose, alginic acid derivative and sugar ester are used in combination, a synergistic result influenced by the three additives can be achieved.

On the other hand, when two of these three additives, e.g. soy cellulose and alginic acid derivative are blended and sugar is added later on in the process, it may not be possible to obtain a thorough blend of the three elements, with the result that it may not be possible to obtain stable and high quality finished products. Also, when alginic acid derivative and sugar ester are mixed without using the soy cellulose, the mixture may not be emulsified satisfactorily, when emulsified by means of a homogenizer, and the product may naturally be accompanied by poor shape retention and by separtion of serum.

When one of these three additives is used independently, the amount of additive to be utilized must be increased. Thereafter, the product may be lacking in flavor and become unedible.

Thus the combined use of these three additives promotes the best utilization of properties of the individual additives by making up for or eliminating disadvantages heretofore explained, whereby whipping cream having excellent and satisfactory physical properties is obtained based on soybean aqueous infusion cream.

Table I indicates properties such as viscosity, texture, flavor and shape retention of the mixture prepared by the use of three elements, i.e. soy cellulose, alginic acid derivative and sugar ester, either jointly or independently.

TABLE I

| | % | viscosity 5° C. cp | texture | flavor | shape retention |
|---|---|---|---|---|---|
| soy cellulose | 0.3 | — (10–20) | slightly viscous | poor | poor |
| alginic acid derivative | 0.5 | +++ (100–200) | highly viscous | poor | highly viscous and poor |
| sugar ester | 0.5 | (18–30) | slightly viscous | poor | poor |
| soy cellulose; alginic acid derivative | 0.3 0.2 | (58–80) | highly viscous | | poor |
| soy cellulose; sugar ester | 0.3 0.2 | — (20–30) | slightly viscous | | poor |
| alginic acid derivative; sugar ester | 0.3 0.2 | ++ (60–110) | ropy; poor emulsification | | poor serum separation |
| soy cellulose; alginic acid derivative; | 0.3 0.2 0.1 | (48–60) | good | good | good |

TABLE I-continued

| | % | viscosity 5° C. cp | texture | flavor | shape retention |
|---|---|---|---|---|---|
| sugar ester | | | | | |

As a result of our examination, the sedimentation velocity of a particle of the whipping cream of the present invention is determined as follows according to Stokes' law:

$$\text{Stokes Law: } v = \frac{Dp(\rho_s - \rho_i)g}{18\mu} = \frac{(0.001)^2(1.3 - 1.0)980}{18(0.01)}$$

$$= 0.0016 \text{ cm/sec} = 5.8 \text{ cm/hr}$$

wherein $v$ represents the sedimentation velocity of a particle (cm/sec), Dp is the diameter of the particle, $\rho_s$ is the density of the particle (g/cm$^3$), $\rho_i$ is the density of the dispersion medium (g/cm$^3$), g is the acceleration of gravity (cm/sec$^2$), and $\mu$ is the viscosity of the dispersion medium (liquid) (g/cm.sec poise).

The value of $\mu$ is determined to be 0.35 based on the experiment, $v$ is calculated to be 0.16 cm/hr based on the above equation. This result suggests that the velocity and physical properties of a particle of the product of the present invention is close to those of a particle of milk emulsion.

A typical exemplary composition of the whipping cream prepared according to the present invention is that in Table II.

TABLE II

| Ingredient | % by weight |
|---|---|
| soybean infusion | 68.49 |
| soy cellulose | 0.3 |
| vegetable oil | 30.00 |
| alginic acid derivative (propylene glycol alginate) | 0.2 |
| sugar ester | 0.1 |
| sucrose | 0.3 |
| sodium polyphosphate (anticoagulant for protein by pH adjustment) | 0.01 |
| antioxidant | 0.3 |
| fruit wine (e.g. brandy) | 0.3 |

The mixture of the above ingredients is stirred at a temperature not higher than 8° C. and cold-homogenized at a pressure of 5 to 10K/cm$^2$. After the completion of emulsification, the mixture is aged at a temperature not higher than 10° C. for approximately 8-10 hours to obtain the desired product.

Accordingly, the present invention provides a process for preparing high quality whipping cream by the unexpected use of a certain material, i.e. soybean aqueous infusion, coupled with the employment of the above mentioned three additives, the combined use of which brings forth a synergistic result, which could neither be obtained by the use of each additive independently nor by the combined use of any two of them. Furthermore, the use of alginic acid derivative improves the viscosity of the product thereby preventing the sedimentation of soy cellulose and some protein. The addition of antioxidant may also prevent the generation of malodor which is mainly caused by the oxidation of unstable oil such as linolic or linolenic acid.

General requirements of convectionary whipping cream listed by the manufacturer are thought to be as follows:

(1) to be whipped in a constant period of time,
(2) to provide form stability of the product,
(3) to be free from serum separation, and
(4) to have an excellent preservability, gloss and flavor.

The vegetable whipping cream prepared by the process of the present invention satisfies all these requirements.

Table III shows the surface tension and viscosity of the whipping cream according to the present invention at different temperatures.

TABLE III

| | 5° C. | 10° C. | 20° C. |
|---|---|---|---|
| Surface tension (dyne)/cm) | 54.0-57.0 | 54.0-58.0 | 53.0-55.0 |
| viscosity (cp) | 48.0-60.0 | 34.0-36.0 | 20.0-25.0 |

The soybean whipping cream of the present invention also has superior whipping properties to that of milk whipping cream. It provides 40%-100% of overrun, an excellent texture and preservability and is free from any deformation at a high temperature of 30°-35° C.

Now processes for preparing soybean food products other than the whipping cream as heretofore described, for instance, for frozen dessert, cooking sauce, vegetable beverage and dessert, will be explained.

It is to be noted that in the process for preparing these other products the same technique based on the same principle is adopted to obtain the same result as those of the above mentioned process for preparing whipping cream. In other words, these other soybean products are obtainable by adopting almost the same process as for whipping cream, in which there exists only a slight alteration or modification of composition or condition such as a practical alteration of material or amount to be utilized.

The preparation of soybean food products other than whipping cream will now be described in detail.

(1) Frozen dessert such as soy-based ice cream, etc.:

The alteration resides in changes of temperature and the content of the composition shown in Table II for whipping cream as heretofore explained. The composition of Table II will hereinafter be referred to as "the composition". Frozen dessert is prepared by employing not more than 30% (e.g. 5-30%) of vegetable oil together with not less than 68.49% (e.g. 93.49%) of soybean infusion corresponding to the increased weight percentage of vegetable oil. the mixture of ingredients of "the composition" is hardened at a temperature of −20° C. or below after aging, while the other factors of "the composition" to be utilized remain unchanged.

A typical exemplary composition of the soy-based ice cream prepared according to the present invention is that in Table IV.

TABLE IV

| Ingredient | % by weight |
|---|---|
| soybean infusion | 93.49-68.49 |
| soy cellulose | 0.3 |
| vegetable oil | 5.00-30.00 |
| alginic acid derivative (propylene glycol alginate) | 0.2 |
| sugar ester | 0.1 |
| sucrose | 0.3 |
| sodium polyphosphate (anticoagulant for protein by pH adjustment) | 0.01 |
| antioxidant | 0.3 |

TABLE IV-continued

| Ingredient | % by weight |
| --- | --- |
| fruit wine (e.g. brandy) | 0.3 |

The mixture of above ingredients is stirred at a temperature not higher than 8° C. and cold-homogenized at a pressure of 5 to 10K/cm². After the completion of emulsification, the mixture is aged at a temperature not higher than 10° C. for approximately 8-10 hours before being hardened at the temperature of −20° C. or below to obtain the desired product.

(2) Cooling sauce such as soy-based mayonnaise, ketchup, dressing sauce, spread sauce, etc.:

It may be prepared by adding a very small amount of spices, for example cinnamon, garlic, caraway seed, etc., or fruit flesh to "the composition" while other factors and conditions remain unchanged.

(3) Vegetable beverage such as soy beverage, etc.:

It may be prepared by restricting the amount of vegetable oil which is not more than 30% (e.g. 5-30%) by weight while increasing the amount of soybean aqueous infusion to not less than 68.49% (e.g. 90.39-68.49%) and by using approximately 3-4% ionic crystal such as NaCl.

A typical exemplary composition of the soy beverage prepared according to the present invention is that in Table V.

TABLE V

| Ingredient | % by weight |
| --- | --- |
| soybean infusion | 90.39-68.49 |
| soy cellulose | 0.3 |
| vegetable oil | 5.00-30.00 |
| alginic acid derivative (propylene glycol alginate) | 0.2 |
| sugar ester | 0.1 |
| sucrose | 0.3 |
| sodium polyphosphate (anticoagulant for protein by pH adjustment) | 0.01 |
| antioxidant | 0.3 |
| fruit wine (e.g. brandy) | 0.3 |
| NaCl | 3.0-4.0 |

The mixture of above ingredients is stirred at a temperature not higher than 8° C. and cold-homogenized at a pressure of 5 to 10K/cm². After the completion of emulsification, the mixture is aged at a temperature not higher than 10° C. for approximately 8-10 hours to obtain the desired product.

(4) Dessert such as jelly, yogurt, pudding, etc.:

It may be prepared by replacing stabilizers in "the composition" with gelatin in an amount of 0.2-0.3% by weight, while the other conditions remain the same.

A typical exemplary composition of the jelly prepared according to the present invention is that in Table VI.

TABLE VI

| Ingredient | % by weight |
| --- | --- |
| soybean infusion | 68.49-68.39 |
| soy cellulose | 0.3 |
| vegetable oil | 30.00 |
| sugar ester | 0.1 |
| sucrose | 0.3 |
| sodium polyphosphate (anticoagulant for protein by pH adjustment) | 0.01 |
| antioxidant | 0.3 |
| fruit wine (e.g. brandy) | 0.3 |
| gelatin | 0.2-0.3 |

The mixture of above ingredients is stirred at a temperature not higher than 8° C. and cold-homogenized at pressure of 5 to 10K/cm². After the completion of emulsification, the mixture is aged at a temperature not higher than 10° C. for approximately 8-10 hours to obtain the desired product.

I claim:

1. A process for preparing a soybean-based frozen dessert, which comprises:

mixing 93.49-68.49% by weight of soybean aqueous infusion, 0.3% by weight of soy cellulose and 5-30% by weight of vegetable oil;

adding 0.2% by weight of alginic acid derivative, 0.1% by weight of sucrose fatty acid ester, 0.3% by weight of sucrose, 0.01% by weight of sodium polyphosphate, 0.3% by weight of anti-oxidant and 0.3% by weight of fruit brandy to the resultant mixture;

stirring the thus obtained mixture at a temperature not higher than 8° C. and cold-homogenizing at a pressure of 5-10K/cm² to obtain an emulsion;

aging the emulsion at a temperature not higher than 10° C. for 8-10 hours; and freezing the aged emulsion at a temperature of about −20 C.

2. A process for preparing a soybean-based whipping cream, which comprises:

mixing 68.49% by weight of soybean aqueous infusion, 0.3% by weight of soy cellulose and 30% by weight of vegetable oil;

adding 0.2% by weight of alginic acid derivative, 0.1% by weight of sucrose fatty acid ester, 0.3% by weight of sucrose, 0.01% by weight of sodium polyphosphate, 0.3% by weight of anti-oxidant and 0.3% by weight of fruit brandy to the resultant mixture;

stirring the thus obtained mixture at a temperature not higher than 8° C. and cold-homogenizing at a pressure of 5-10K/cm² to obtain an emulsion; and aging the emulsion at a temperature not higher than 10° C. for 8-10 hours.

* * * * *